UNITED STATES PATENT OFFICE.

MORIZ WEINRICH, OF ST. LOUIS, MISSOURI.

PROCESS OF REVIVIFYING BONE-BLACK.

SPECIFICATION forming part of Letters Patent No. 533,106, dated January 29, 1895.

Application filed December 18, 1893. Serial No. 493,969. (No specimens.)

*To all whom it may concern:*

Be it know that I, MORIZ WEINRICH, of the city of St. Louis and State of Missouri, have invented certain new and useful Improvements in Processes of Revivifying Bone-Black; and I do hereby declare that the following is a full, clear, and exact description of the invention, which will enable others skilled in the art to which it appertains to make and use the same.

In my United States Patent No. 509,460, dated November 28, 1893, I have described a new process of regenerating spent boneblack, consisting in supplying it with a new charge or coating of animal carbon, by impregnating it with a solution of organic animal matter and then drying and charring said product. I have made the further discovery that solutions of certain vegetable matters, will also regenerate spent boneblack to such a degree that its efficiency is again equal to that of new boneblack.

The vegetable materials I make use of in my present improvement are molasses, (either cane, or beet molasses,) glucose, starch, and flour made from wheat, corn or other grains.

In using molasses or glucose, I proceed as follows: The spent boneblack is deprived first as far as practicable, of all of its carbon by heating it in any desired way until the carbon is burned off and only the mineral frame work left, thus freeing the pores from the layer of the old and consequently ineffective carbon. The decarbonized boneblack is put into an open pan provided with a double steam-bottom or a steam coil, in which pan a certain amount of hot molasses or glucose, diluted with water, has previously been put. For each one-thousand (1,000) pounds of decarbonized boneblack, I use about fifteen hundred (1,500) pounds of such a solution of molasses or of glucose, containing say ten per cent. of solid matter. The decarbonized and very porous boneblack will absorb at once most of the solution. Steam is now applied, and the mass boiled until its water contents are reduced to such a degree that the molasses or glucose will all stick on the surface and in the pores of the boneblack. The mass is then taken out and dried on a heated surface, or by some other suitable device or means. As soon as the boneblack thus coated with molasses or glucose is entirely dry, it is charred in boneblack kilns in the well known way, until all the organic matter is carbonized and covers the mineral framework with a new coat of vegetable carbon. The burned and coated boneblack is now washed with pure hot water and is then ready for use.

In using starch or flour, these materials require a preliminary treatment before being brought into contact with the boneblack in order to decompose their gluten, thus securing a good impregnation and preventing the particles of the boneblack from baking together during the drying of the impregnated mass. To this end I dissolve the starch or flour in cold acid water. For each one hundred (100) pounds of starch or flour I use a thousand (1,000) pounds of water, mixed with about twenty (20) pounds of muriatic acid of 22° Baumé. As soon as the starch or flour is dissolved, the solution is heated up to boiling point and kept boiling (being at the same time stirred) until it has lost all glutinousness, and has attained a semi-transparent appearance. Lime is now added until the solution is neutral, or only slightly acid; after which the decarbonized boneblack is put into the solution in the proportion of one thousand (1,000) pounds of boneblack to say about twelve hundred (1,200) pounds of the solution. The subsequent treatment is exactly the same as that above described for molasses or glucose.

The price of these vegetable materials is generally cheaper than that of gelatine or blood, besides which decarbonized boneblack coated in this way with vegetable carbon can be used also to good advantage in industries in which the applying of animal carbon is not advisable, as for instance for the decolorizing cotton-seed oil.

Instead of decarbonized boneblack, other materials, consisting of a porous mineral frame-work, as for instance pumice-stone, may be used. Their treatment is the same as that of boneblack. Such filtering materials, because containing no carbonate of lime, would be especially useful in the manufacture of tartaric-acid.

I claim—

The described process of regenerating and recarbonizing spent bone-black, consisting in first depriving it as far as possible of all its old carbon, and then re-supplying it with a new charge or coating by impregnating it with a solution of starch or flour prepared by dissolving it in cold acidulated water, then heating it to decompose the gluten, and then neutralizing it with lime.

MORIZ WEINRICH.

Witnesses:
ARTHUR BUCHROEDER,
C. C. HARTMAN.